(12) United States Patent
Söderberg et al.

(10) Patent No.: US 8,164,775 B2
(45) Date of Patent: Apr. 24, 2012

(54) APPARATUS AND METHOD FOR AUTOMATED TICKET AND BOARDING

(75) Inventors: Urban Söderberg, Molndal (SE); Martin Forsberg, Molndal (SE)

(73) Assignee: Intermec IP Corp., Everett, WA (US)

( * ) Notice: Subject to any disclaimer, the term of this patent is extended or adjusted under 35 U.S.C. 154(b) by 1136 days.

(21) Appl. No.: 11/862,047

(22) Filed: Sep. 26, 2007

(65) Prior Publication Data

US 2008/0169341 A1 Jul. 17, 2008

Related U.S. Application Data

(60) Provisional application No. 60/847,415, filed on Sep. 26, 2006, provisional application No. 60/847,460, filed on Sep. 26, 2006, provisional application No. 60/847,461, filed on Sep. 26, 2006, provisional application No. 60/847,462, filed on Sep. 26, 2006.

(51) Int. Cl.
*G06Q 10/00* (2012.01)
*G09F 3/00* (2006.01)

(52) U.S. Cl. ............... 358/1.15; 705/5; 283/23; 283/28; 283/29; 283/74; 283/80

(58) Field of Classification Search ................. 358/1.15; 399/369, 389, 391, 393; 705/13–15, 5; 232/18, 232/375, 382, 384, 381, 462.13, 462.15; 283/23, 28, 29, 74, 80
See application file for complete search history.

(56) References Cited

U.S. PATENT DOCUMENTS

| | | | | |
|---|---|---|---|---|
| 3,445,633 A * | 5/1969 | Ratner | ........................... | 235/381 |
| 4,011,811 A * | 3/1977 | Kodis | ......................... | 101/93.07 |
| 4,965,437 A * | 10/1990 | Nagai | ............................ | 235/381 |
| 5,358,238 A | 10/1994 | Mandel et al. | ................. | 271/298 |
| 5,401,944 A * | 3/1995 | Bravman et al. | ............... | 235/375 |
| 5,599,117 A | 2/1997 | Faes et al. | ...................... | 400/605 |
| 5,684,285 A * | 11/1997 | Faes et al. | ...................... | 235/449 |
| 5,866,888 A * | 2/1999 | Bravman et al. | ............... | 235/375 |
| 5,943,651 A * | 8/1999 | Oosawa | ............................ | 705/5 |
| 5,971,632 A | 10/1999 | LaDue et al. | ................... | 400/68 |
| 6,338,436 B1 * | 1/2002 | Iguchi et al. | ................... | 235/488 |
| RE38,111 E | 5/2003 | LaDue et al. | ................... | 400/68 |
| 6,695,203 B2 * | 2/2004 | Iki et al. | ........................ | 235/375 |
| 6,994,250 B2 * | 2/2006 | Al Amri | ........................ | 235/375 |
| 7,017,806 B2 | 3/2006 | Peterson | ........................ | 235/384 |
| 7,178,954 B2 * | 2/2007 | Blechschmidt | ............... | 362/471 |

(Continued)

OTHER PUBLICATIONS

Airlines Reporting Corporation, "Enhanced Duplicate Ticket Functionality," URL = http://www.arccorp.com/iarenh_060404.htm, download date Feb. 23, 2006.

(Continued)

*Primary Examiner* — Twyler Haskins
*Assistant Examiner* — Dennis Dicker
(74) *Attorney, Agent, or Firm* — Seed IP Law Group PLLC

(57) ABSTRACT

An automated ticketing and boarding (ATB) device may replace both legacy boarding pass printers and gate readers, without reconfiguring existing departure control systems (DCSs). The replacement ATB device may create a virtual magnetic stripe in memory from the formatted flight and/or passenger information received from the DCS, and may extract portions of the virtual magnetic stripe to form a boarding pass with an optical machine-readable symbol instead of a magnetic stripe transparently to the DCS.

20 Claims, 14 Drawing Sheets

U.S. PATENT DOCUMENTS 7,593,530 B2 * 9/2009 Karaoguz et al. ............. 380/258
2009/0122350 A1 * 5/2009 Alverson et al. ............. 358/3.28

OTHER PUBLICATIONS

ALC—Airline Link Control, "Glossary of commonly used terms," URL = http://devweb.ads.sita.aero/devwebprocess/requestglossary.html, download date May 9, 2006.

ARINC News, "ARINC Simplifies IATA Bar Code with New JADE™ 2.0 Release for Airlines," URL = http://www.arinc.com/news/2004/11-16b-04.html, original download date Nov. 16, 2004.

"ATB Imager for Windows" User's Guide, Glossary M, Second Edition, Feb. 2001, URL = http://web.archive.org/web/20050130152729/http://www.travsys.nl.downloads/us-td-006.pdf, download date Mar. 4, 2011.

IBM, "PostScript printing," URL = http://publib.boulder.ibm.com/infocenter/pseries/v5r3/index.jsp?topic=/com.ibm.aix.printergd/doc/printrgd/postscript_printers.htm, download date Apr. 17, 2006. (URL changed from original access date.).

IBM, "Submitting PSF printer input to a PCL or PPDS printer," URL = http://www4.infoprintsolutionscompany.com/help/index.jsp?topic=/com.ibm.printers.ipmaix/com.ibm.printers.aixprocedures/iprx4mst243.htm, download date Apr. 17, 2006. (URL changed from original access date.).

IER Transportation Industry, URL = http://www.ier.fr/~uk/, download date Feb. 23, 2006.

International Air Transport Association, "About Us," URL = http://www.iata.org/about/, download date Feb. 24, 2006.

International Air Transport Association, "Bar-Coded Boarding Passes (BCBP)," URL = http://www.iata.org/whatwedo/bcbp/index.htm, download date Feb. 24, 2006.

International Air Transport Association, "Common Use Self Service (CUSS)," URL = http://www.iata.org/whatwedo/cuss/index.htm, download date Feb. 24, 2006.

International Air Transport Association, "IATA is Simplifying the Business," URL = http://www.iata.org/whatwedo/simplibiz, download date Feb. 24, 2006.

International Air Transport Association, "Simplifying the Business—Strategy 2006:BCBP," Jan. 11, 2006.

International Air Transport Association, "StB Preferred Partners," URL = http://www.iata.org/whatwedo/simplibiz/stbpreferredpartners.htm, download date Feb. 24, 2006.

International Air Transport Association, "Ticketing Committee," URL = http://www.iata.org/workgroups/pfpc.htm, download date Feb. 24, 2006.

Japan Airlines, "Learning about Types of Air-Tickets," URL = http://www.id.jal.com/cms/contents/en/jal_news_278.html, download date Feb. 23, 2006.

Omni Data Systems, "Fujitsu F-9811 ATB Ticket Printer," URL = http://www.omnidatasys.net/product/desc_printer_fuji9811.htm, download date Feb. 23, 2006.

"Resolution 722c: Automated Ticket/Boarding Pass—Version 2 (ATB2)(Amending)," International Air Transport Association, Oct. 2004, 2 pages.

"Resolution 792: Bar Coded Boarding Pass," International Air Transport Association, $25^{th}$ Edition, Jun. 2005, pp. 753-759.

Unimark, "Bar Code Printers," revised Dec. 14, 1996, URL = http://web.archive.org/web/19961220204111/http://www.unimark com/, download date Feb. 25, 2011.

Unimark, "ET6000 ATB and Bag Tag Printer," URL = http://replay.waybackmachine.org/20060518075148/http://www.unimark.com/products/display_product?pid=29&term=ATB%20Ticket%20Printers, download date Feb. 25, 2011.

Unimark, "Land, Sky or Water," URL = http://replay.waybackmachine.org/20050902201748/http://www.unimark.com/, download date Feb. 25, 2011.

Unimark, "Products," URL = http://replay.waybackmachine.org/20060505214344/http://www.unimark.com/products/display_list?term=ATB+Ticket+Printers, download date Feb. 25, 2011.

Unimark, "Sprite ATB2 Printer," URL = http://replay.waybackmachine.org/20060518075442/http://www.unimark.com/products/display_product?pid=28&term=ATB%20Ticket%20Printers, download date Feb. 25, 2011.

Unimark, "Travelpro I ATB Printer," URL = http://replay.waybackmachine.org/20060518080724/http://www.unimark.com/products/display_product?pid=75&term=ATB%20Ticket%20Printers, download date Feb. 25, 2011.

Unimark, "XP ATB2 Boarding Pass Printer," URL = http://replay.waybackmachine.org/20060518080716/http://www.unimark.com/products/display_product?pid=82&term=ATB%20Ticket%20Printers, download date Feb. 25, 2011.

Unimark, Travelpro II ATB Printer, URL = http://replay.waybackmachine.org/20060518080711/http://www.unimark.com/products/display_product?pid=77&term=ATB%20Ticket%20Printers, download date Feb. 25, 2011.

Wikipedia, "Barcode," URL = http://en.wikipedia.org/wiki/Barcode, download date Apr. 5, 2006.

* cited by examiner

| set of printing instructions | add'l print data [presuming 2D bar code not meant to be considered add'l print data] 272 | add'l formatting 274 |
|---|---|---|
| 1 | background color = blue + "FIRST CLASS" | overprint row 7, col -20-40,43 |
| 2 | background color = yellow + "BUSINESS CLASS" | overprint row 7, col 20-42, 45-50 |
| 3 | no add'l print data | rotate 90° & print on media of 2nd size |
| 4 | no add'l print data | no add'l formatting |

Printing Instructions 270

FIG. 6

APPARATUS AND METHOD FOR AUTOMATED TICKET AND BOARDING

CROSS-REFERENCE TO RELATED APPLICATION

This application claims the benefit under 35 U.S.C. §119(e) of
U.S. Provisional Patent Application No. 60/847,415 filed Sep. 26, 2006;
U.S. Provisional Patent Application No. 60/847,460 filed Sep. 26, 2006;
U.S. Provisional Patent Application No. 60/847,461 filed Sep. 26, 2006; and
U.S. Provisional Patent Application No. 60/847,462 filed Sep. 26, 2006;
where these four provisional applications are incorporated herein by reference in their entireties.

BACKGROUND

1. Field

The present disclosure generally relates to the field of automatic data collection, for example barcodes, magnetic stripes, and/or radio frequency identification (RFID), and more particularly to automated ticketing and boarding systems, apparatus, and methods, for example automated ticketing and boarding for use in the commercial air travel.

2. Description of the Related Art

Airlines have adopted automatic data collection (ADC) techniques to provide for automated ticketing and boarding (ATB) of passengers. ATB systems typically employ a departure control system (DCS) to track and provide information regarding particular passengers, flights and/or baggage or luggage. The DCS may act as a central depository, providing information to one or more airlines.

Each airline typically employs one or more boarding pass printers at one or more check-in areas. Traditionally, the check-in area is typically located proximate the entrance of the airport terminal and allows passengers to be identified, receive a boarding pass upon presentation of their ticket, and check baggage. More recently, some airlines are locating automated check-in kiosks at other areas of the airport, as well as at areas outside of the airport, for example parking lots.

Boarding pass printers typically include a magnetic stripe encoder for encoding magnetic information in a magnetic stripe carried by the boarding pass. The boarding pass printer may also include a more conventional print head (e.g., thermal, impact, ink jet, etc.) to print human readable information on one or both sides of the boarding pass. Typical boarding pass printers include multiple bins or receptacles (e.g., three receptacles) for holding different types of media. The different types of media may have different background colors and/or have different preprinted indicia, for example, headings or titles. Upon presentation of a ticket, airline personnel query the DCS which provides flight and/or passenger information to the boarding pass printer to generate the boarding pass. The flight and/or passenger information is provided in a form that is formatted for inclusion in a magnetic stripe. The boarding pass printer relies on a parameter table, commonly referred to as PECTAB to decipher the formatted flight and/or passenger information received from the DCS.

Airlines also employ gate readers for reading boarding passes. Gate readers are typically located proximate the gate or gangway. Gate readers include magnetic stripe readers for automatically reading data encoded in the magnetic stripe of the boarding pass. The gate reader can send an acknowledgement to the DCS, indicating that the passenger has boarded a flight.

The International Air Transport Association (IATA) has recently adopted standards that allow for the use of two-dimensional machine readable symbols (i.e., two-dimensional barcodes commonly referred to as matrix code or area code symbols) on boarding passes in lieu of magnetic stripes. This allows airlines to employ optical machine-readable symbol readers in lieu of magnetic stripe readers and optical machine-readable symbol printers in lieu of magnetic stripe encoders. Use of optical machine-readable symbol equipment may significantly reduce costs. However, adoption of such systems may be hindered by potentially exorbitant costs associated with updating the DCS to operate with the optical machine-readable symbol equipment.

BRIEF SUMMARY OF THE INVENTION

In one aspect, the present disclosure is directed to a printer including a first number of print media receptacles sized to hold print media; a print head operable to print on the print media; and a controller coupled to receive print commands comprising received print data and a legacy media identifier indicative of one of a second number of legacy print media receptacles of a legacy printer, a total number of legacy print media receptacles in the second number of legacy print media receptacles greater than a total number of print media receptacles in the first number of print media receptacles wherein the controller is configured to resolve at least two received print commands with respective legacy media identifiers that respectively identify at least two different ones of the legacy print media receptacles by causing the print head to print on the print media from a same one of the first number of print media receptacles.

In another aspect, the present disclosure is directed to a printer including a communications port configured to receive a set of magnetic stripe data from a legacy computing system, the magnetic stripe data formatted for encoding into a plurality of tracks of a magnetic stripe; a conversion manager configured to: select portions of the magnetic stripe data based at least in part on a respective location of each of the portions in the formatted magnetic stripe data; and encode the selected portions into a set of machine-readable symbol data representative of machine-readable symbol characters selected from a machine-readable symbology; and a print head operable to print at least one machine-readable symbol based at least in part on the set of machine-readable symbol data.

In another aspect, the present disclosure is directed to a printer including a controller configured to receive a command from a legacy computing system to create a boarding pass on media of a first size, the boarding pass to include a set of data in a legacy format; and a print head operable to print at least a portion of the set of data in a non-legacy format, different from the legacy format, on print media that is smaller than the media of the first size.

In another aspect, the present disclosure is directed to an automatic ticketing and boarding system device for operating with a departure control host computing system. The automatic ticketing and boarding system includes a magnetic stripe reader operable to read information from magnetic stripes carried by boarding passes and from magnetic stripes carried by non-boarding pass media; an optical reader operable to optically read information from at least machine-readable symbols; a printer operable to at least print machine-readable symbols based on formatted information; and a control subsystem coupleable to communicate with the departure control host computing system, where in at least a gate reader mode the control subsystem is configured to confirm flight data for a passenger with the departure control host computing system based at least in part on information read from a boarding pass associated with the passenger; and where in at least a check-in mode the control subsystem is configured to determine an identity of the passenger based at least in part on data read from a magnetic stripe of a non-boarding pass medium, and configured to print a boarding pass based at least in part on formatted data received from the departure control host computing system.

In another aspect, the present disclosure is directed to a method of operating an automatic ticketing and boarding system device that communicates with a departure control host computing system and which is capable of operating in at least two different operating modes including a gate reader mode and a check-in mode. The device includes a magnetic stripe reader operable to read information from magnetic stripes carried by boarding passes and from magnetic stripes carried by non-boarding pass media, an optical reader operable to optically read information from at least machine-readable symbols, a printer operable to at least print machine-readable symbols based on formatted information, and a control subsystem configured to execute processor-executable instructions stored in a memory. The method includes determining a selected one of the operating modes from the at least two different operating modes; identifying a corresponding set of processor-executable instructions based on the determination of the selected one of the operating modes; and executing the identified corresponding set of processor-executable instructions.

In another aspect, the present disclosure is directed to a method of operating a replacement printer having a lesser number of print media receptacles than a number of print media receptacles of a legacy printer. The method includes receiving print commands at the replacement printer, the print commands including received print data and an identifier indicative of a selected one of the number of print media receptacles of the legacy printer; based at least in part on the identifier indicative of the selected one of the number of print media receptacles of the legacy printer identified in the print commands received by the replacement printer, selecting between at least a first set of instructions for printing on print media from a first print media receptacle of the replacement printer and a second set of instructions for printing on print media from the first print media receptacle of the replacement printer, wherein the first set of instructions provide at least one of additional print data in addition to the received print data or additional formatting and wherein the second set of instructions is different from the first set of instructions; and printing on the print media from the first print media receptacle based on the selected one of the first and the second sets of instructions.

In another aspect, the present disclosure is directed to a device to facilitate printing. The device includes at least one processor-readable medium storing at least one data structure that maps a plurality of legacy print media receptacle identifiers indicative of respective ones of a plurality of legacy physical print media receptacles to a plurality of virtual print media receptacles associated with a replacement printer, at least a first one of the virtual print media receptacles associated to a first replacement physical print media receptacle and a first set of printing instructions and a second one of the virtual print media receptacles associated to the first replacement physical print media receptacle and a second set of printing instructions, different than the first set of printing instructions.

In another aspect, the present disclosure is directed to a method of operating a printer in response to commands from a legacy computing system that is configured to operate with a magnetic stripe encoder. The method includes receiving a set of magnetic stripe data from the legacy computing system, the magnetic stripe data formatted for encoding into a plurality of tracks of a magnetic stripe; creating a virtual magnetic stripe data structure in a memory of the printer that stores the received set of magnetic stripe data formatted in the plurality of tracks; extracting a number of pieces of the magnetic stripe data from the virtual magnetic stripe data structure, wherein the number of extracted pieces of the magnetic stripe data is less than all of the pieces of the magnetic stripe data in the virtual magnetic stripe data structure; encoding at least the number of extracted pieces of magnetic stripe data into a set of machine-readable symbol data representative of machine-readable symbol characters selected from a machine-readable symbology; and printing a machine-readable symbol based on the set of machine-readable symbol data.

In another aspect, the present disclosure is directed to a method of operating a printer in response to commands from a legacy computing system that is configured to operate with a magnetic stripe encoder. The method includes receiving a set of magnetic stripe data from the legacy computing system, the magnetic stripe data formatted for encoding into a plurality of tracks of a magnetic stripe; creating a virtual magnetic stripe data structure in a memory of the printer that stores the received set of magnetic stripe data formatted in the plurality of tracks; storing additional data to the virtual magnetic stripe data structure in the memory of the printer, the additional data formatted as a number of additional data tracks in addition to the plurality of tracks; extracting a portion of the data from the virtual magnetic stripe data structure, encoding at least the extracted portion of the data from the virtual magnetic stripe data structure into a set of machine-readable data representative of machine-readable symbol characters selected from a machine-readable symbology; and printing a machine-readable symbol based on the set of machine-readable symbol data, wherein the machine-readable symbol represents at least a portion of the received set of magnetic stripe data and at least a portion of the additional data.

In yet another aspect, the present disclosure is directed to a method of operating a printer in response to a legacy computing system configured to operate with a boarding pass printer having printing and magnetic stripe encoding capabilities. The method includes receiving a command to create the boarding pass on media of a first size, the boarding pass to include a set of data in a legacy format; and in response to the received command, printing at least a portion of the set of data on print media in a non-legacy format, different from the legacy format, and on print media that is smaller than the media of the first size.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements, as drawn, are not intended to convey any information regarding the actual shape of the particular elements, and have been solely selected for ease of recognition in the drawings.

FIG. 1 is schematic view of an automated ticketing and boarding environment including a departure control system, an airline host computing system, a number of legacy boarding pass printers, a number of legacy gate readers, a number of replacement automated ticketing and boarding devices some operating in a check-in mode and others operating in a gate reader mode, according to one illustrated embodiment.

FIG. 6 is a schematic diagram of a data structure that may be stored in a computer- or processor-readable memory which stores printing instructions, according to another illustrated embodiment.

DETAILED DESCRIPTION OF THE INVENTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with printers, ADC readers such as optical machine-readable symbol readers including scanner and/or imager type machine-readable symbol readers, magnetic stripe encoders, magnetic stripe readers, conventional computing systems, and/or networks and related systems have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

It should be noted that, as used in this specification and the appended claims, the singular forms "a," "an," and "the" include plural referents unless the content clearly dictates otherwise. Thus, for example, reference to a system for evaluating a compound candidate for iontophoretic drug delivery including "a processor" includes a single processor, or two or more processors. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1:
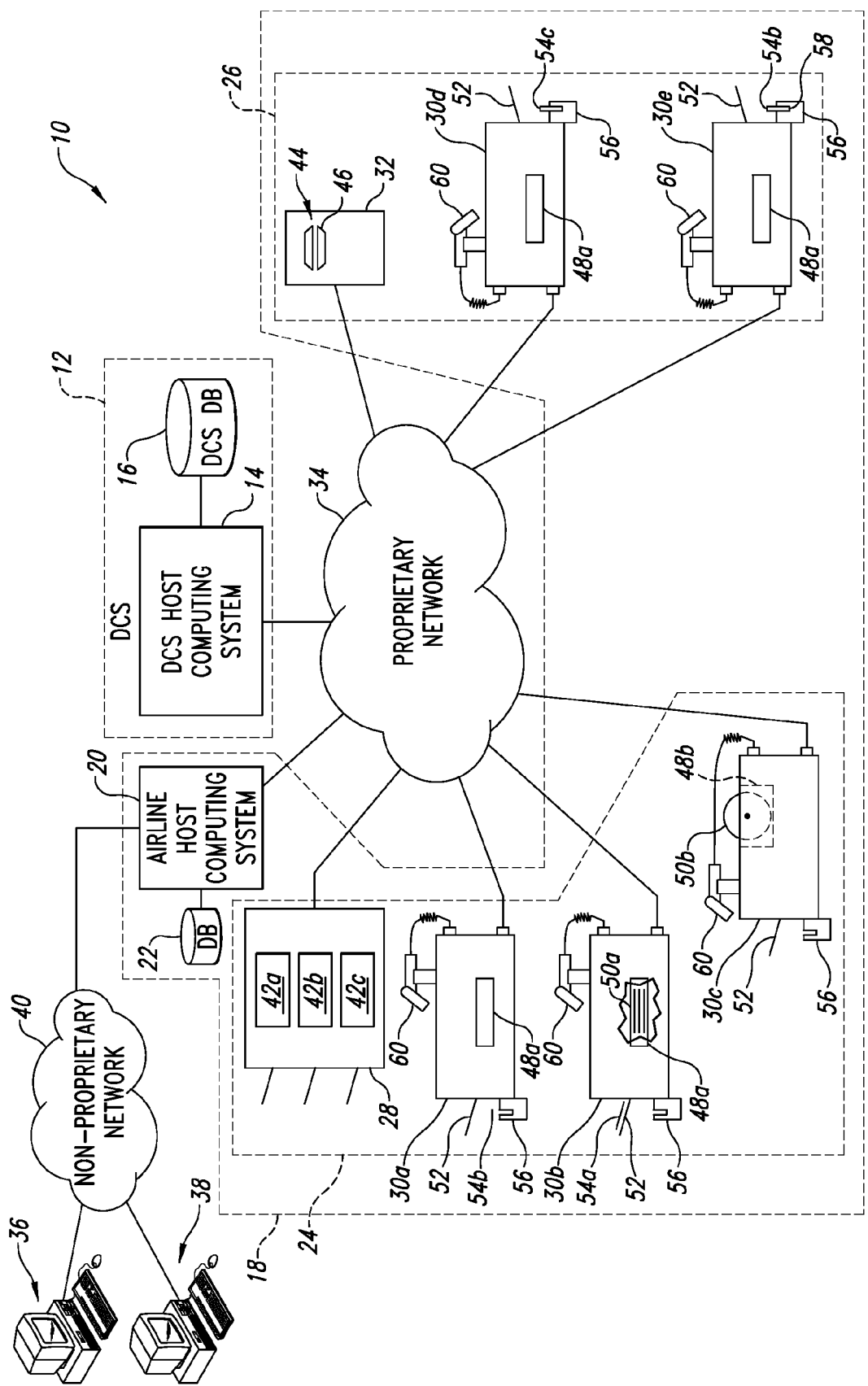

FIG. 1 shows an automated ticketing and boarding (ATB) system 10, according to one illustrated embodiment.

The ATB system 10 may include a departure control system (DCS) 12 including a DCS host computing system 14 and associated database 16 to maintain information regarding flights, passengers, and/or baggage. The DCS host computing system 14 and DCS database 16 may maintain such information for one or more airlines.

The ATB system 10 may also include an airline specific ATB system 18 operable to track and provide information about various flights, passengers, and baggage.

The airline specific ATB system 18 may include an airline host computing system 20 and associated airline database 22. The airline specific ATB system 18 may also include a check-in subsystem 24 and gate reader subsystem 26. The check-in subsystem 24 may include a number of legacy boarding pass printers 28 (only one shown) and a number of replacement ATB devices 30a-30c. The gate reader subsystem 26 may include a number of legacy boarding pass readers 32 (only one shown) and a number of replacement ATB devices 30d, 30e. The replacement ATB devices 30a-30e are collectively referenced herein as 30. As used herein, the term "replacement" means that the device is different from one or more legacy devices, for example legacy boarding pass printers or encoders, or legacy gate readers. The term replacement does not necessarily mean that the replacement device has been substituted one-for-one for the legacy device, but rather that the replacement device is seen by the DCS as being functionally identical to the legacy device it replaces or mimics.

The airline host computing system 20, legacy boarding pass printer 28, legacy boarding pass reader 32, and replacement ATB devices 30 may be communicatively coupled to one another and/or to the DCS host computing system 14 via a network such as a proprietary network 34. The proprietary network 34 may, in some embodiments, form part of the airline specific ATB system 18, the DCS system 12, or may belong to a third party. The airline host computing 20 may allow access by non-airline personnel. For example, the airline host computing system 20 may provide access to travel agents via a travel agent computing system 36. Additionally, or alternatively, the airline host computing system 20 may provide access to individuals, for example passengers, via third-party computing system 38. The travel agent and third-party computing systems 36, 38 may be communicatively coupled to the airline host computing system 20 via a non-proprietary network 40 such as the Internet or Worldwide Web portion of the Internet.

The legacy boarding pass printer 28 typically includes two or more media receptacles 42a-42c (collectively 42), which are commonly referred to as "bins." Each of the media receptacles 42 holds or stores a respective type of media. For example, each of the media receptacles 42 may hold a distinct type of boarding pass, or portion of a boarding pass. For example, media in one receptacle 42a may be a first color (e.g., white), while media in a second receptacle 42b may be a second color (e.g., blue). Additionally, or alternatively, media in a first receptacle 42a may bear certain preprinted indicia (e.g., header, footer, logo or trademark) while media in the second receptacle 42b may bear none or different preprinted indicia.

As noted in the background, the legacy boarding pass printer 28 includes a magnetic stripe encoder for encoding information in a magnetic stripe of a boarding pass. The legacy boarding pass printer 28 typically receives formatted flight and/or passenger information from the DCS 12. The flight and/or passenger information is formatted according to a PECTAB, typically stored in or at the legacy boarding pass printer 28.

The legacy boarding pass reader 32 typically consists of a magnetic strip reader 44, which typically includes a slot 46 for passing the magnetic stripe carried by a boarding pass through the magnetic stripe reader 44. Information read from the magnetic stripe may be supplied to the DCS 12.

The replacement ATB devices 30a-30c used in the check-in area may be identically or similarly constructioned to the ATB devices 30d, 30e used in the gate area. This advantageously may provide a substantial cost savings to the airlines. For example, a larger number of ATB devices 30 may be produced, lending economies of scale in the manufacturing, distribution and maintenance of such ATB devices 30. Further, commonality may provide airlines with greater flexibility in reconfiguring their ATB systems, for example, by moving some ATB devices 30 from one area or functions to a different area or function. Commonality may also simplify maintenance, since maintenance personnel only need to be familiar with one type of ATB device, and may reduce the total number of spare devices and/or parts that are purchased and stored.

The replacement ATB device 30 will typically include a smaller number of print media receptacles 48 than the legacy boarding pass printer 28. For example, the typically replacement ATB device 30 may employ a single print media receptacle 48. The print media receptacle 48 may take the form of a compartment 48a sized and configured to hold a stack of print media 50a, or a compartment 48b sized and configured to hold a roll of print media 50b. Print media is collectively referenced herein as 50. The replacement ATB device 30 may also include an output tray or receptacle 52 sized and dimensioned for receiving printed print media such as printed boarding passes 54 (only one shown in FIG. 1).

The replacement ATB device 30 also includes a magnetic stripe reader 56 including a slot 58 (only one called out in FIG. 1) sized and dimensioned for receiving a magnetic stripe bearing portion of a boarding pass 54b or identification or financial media 54c, for example, driver's license, passport, national identification card, credit card and/or debit card, etc.

The replacement ATB device 30 further includes an optical machine-readable symbol reader 60 which may be handheld and/or fixed to a housing of the ATB device 30 or proximate thereto. The optical machine-readable symbol reader 60 may take a variety of forms including scanning type machine-readable symbol readers (commonly referred to as bar code scanners) or imaging type machine-readable symbol readers. Optical machine-readable symbol readers capable of reading two-dimensional optically machine-readable symbols may be advantageous. While illustrated as being wired to the housing of the ATB device 30, the optical machine-readable symbol readers 60 may be wirelessly coupled to communicate with the remainder of the ATB device 30, for example, via radio frequency (RF) or optical (e.g., infrared) signals.

Figure 2:
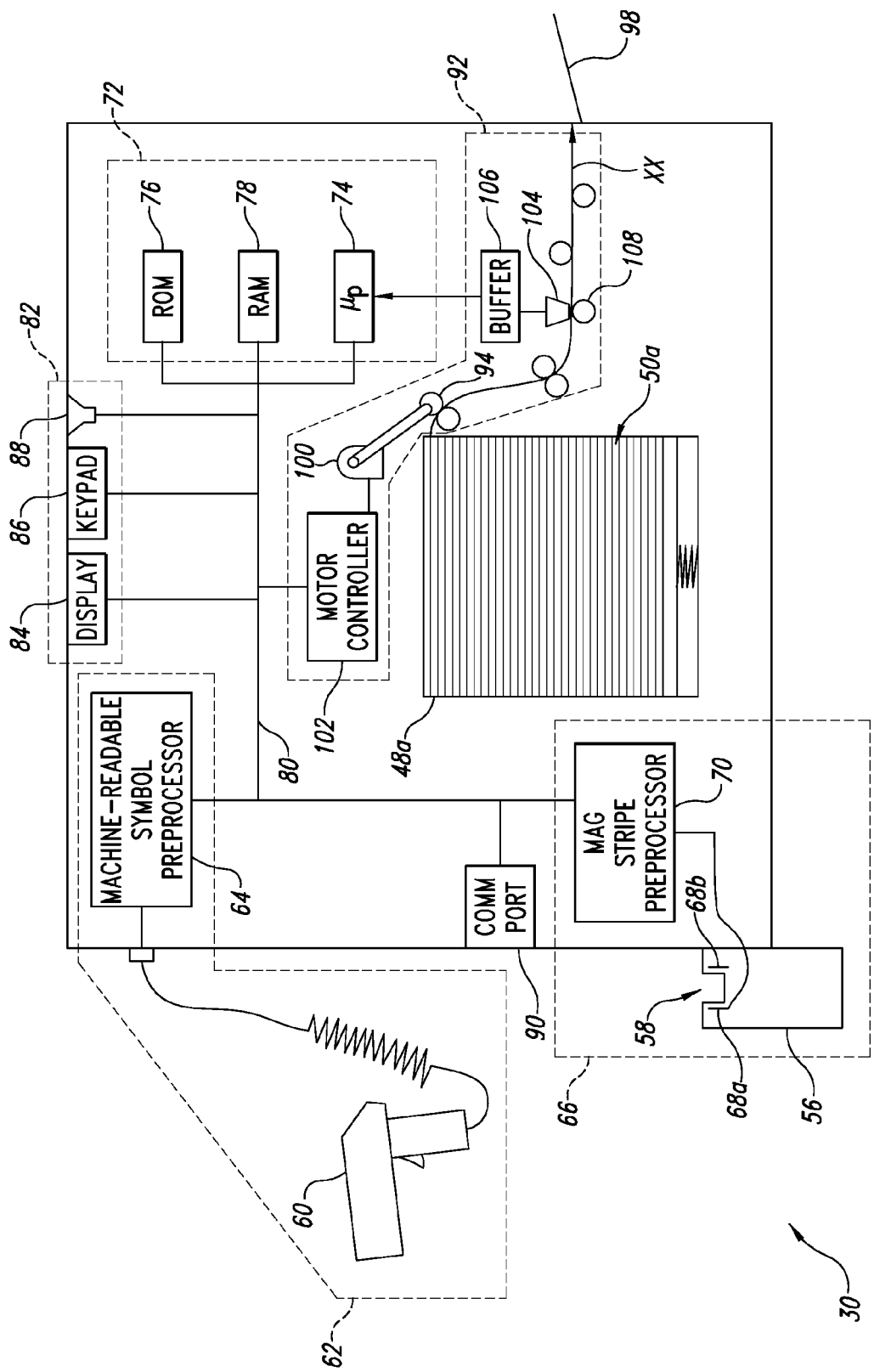
FIG. 2 is a schematic diagram of an automated ticketing and boarding device according to one illustrated embodiment.

FIG. 2 shows a replacement ATB device 30 according to one illustrated embodiment. The replacement ATB device 30 is designed to function as a boarding pass printer in a check-in mode and as a gate reader in a gate reader mode.

The ATB device 30 may include an optical reading subsystem 62 operable to optically read from media, for example, boarding passes 54a. In one embodiment, the optical reading subsystem 62 may include the optical machine-readable symbol reader 60 and may optionally include a machine-readable symbol preprocessor 64. The optical machine-readable symbol reader 60 may scan or image optically machine-readable symbols (e.g., barcode symbols, matrix or area code symbols, stacked symbols). The optical machine-readable symbol reader 60 may convert the read symbols into data, for example, ASCII data as is known in the art. Alternatively, or additionally, an optional machine-readable symbol preprocessor 64 may process scan or image data generated by the optical machine-readable symbol reader 60. The machine-readable symbol preprocessor 64 may, for example, take the form of one or more digital signal processors (DSPs), microprocessors, or application specific integrated circuits (ASICs). As discussed above, the optical machine-readable symbol reader 60 can capture optically machine-readable symbols from various media, for example, boarding passes, passports, driver's licenses, identity cards, and other forms of media. Additionally, or alternatively, the optical machine-readable symbol reader 60 may also be capable of capturing human-readable symbols such as text and/or numbers from a variety of media. In such embodiments, the machine-readable symbol processor 64 may perform optical character recognition (OCR) on the captured data.

The replacement ATB device 30 may include a magnetic stripe reader subsystem 66, which may include the magnetic stripe reader 56 with appropriate sensors 68a, 68b for detecting or reading data encoded in the magnetic stripe. The magnetic stripe reader subsystem 66 may also include a magnetic stripe preprocessor 70 configured to convert data read by the magnetic stripe reader 56 into a useable form, for example, ASCII. Consequently, the magnetic stripe reader 56 is capable of reading information encoded in magnetic stripes from a variety of media, for example, boarding passes carrying magnetic stripes, credit cards, debit cards, passports, driver's licenses, and other identification or financial media.

The ATB device 30 also includes a control subsystem 72 which may include one or more controllers, for example, microprocessor 74, DSPs, and/or ASICs. The control subsystem 72 may also include one or more computer or processor readable media, for example, read only memory (ROM) 76 and random access memory (RAM) 78. The control subsystem 72 is communicatively coupled to the various other subsystems via one or more buses 80, for example, instruction buses, address buses, power buses, or the like.

The ATB device 30 further includes a user interface 82 which may include one or more displays 84, keyboards or keypads 86, and speakers 88. In some embodiments, the display 84 may take the form of a touch sensitive display which may be in addition to the keypad 86, or may substitute for the keypad 86. The ATB device 30 further includes one or more communication ports 90, which may allow wired or wireless communications with other devices, for example, the DCS host computing system 14, airline specific host computing system 20, and/or other devices and systems.

The replacement ATB device 30 further includes a printer subsystem 92. The printer subsystem 92 may include a number of rollers 94 (only one called out) and/or other mechanisms for driving media 48a along a media path 96 to an output tray or receiver 98. Some or all of the roller 94 may be driven, or some or all of the roller may be not be driven. The printer subsystem 92 may also include one or more motors 100 and/or motor controllers 102 coupled to advance media 48a along the media path 96, for example by driving one or more of the rollers 94.

The printer subsystem 92 includes at least one print head 104 and optionally includes a print buffer 106 for temporarily storing print data to be printed by the print head 104 on the media 48a. A fixed or a pivoting platen 108 may be opposed from the print head 104. The print head 104 can take any of a variety of forms including a thermal print head, inkjet print head, impact print head, or electrostatic print head, to name a few. Alternatively, the print head 104 may form indicia using non-traditional printing mechanisms, for example, electronic paper.

Figure 3:
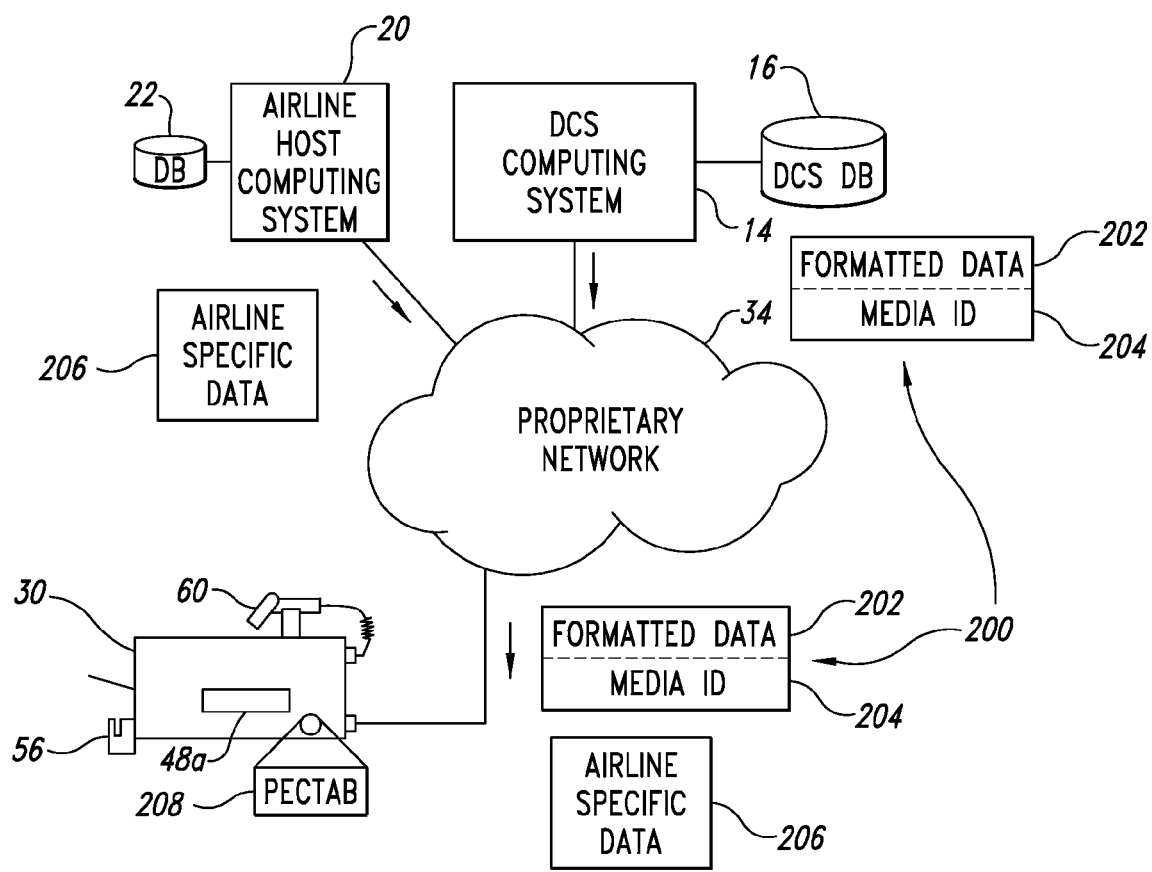
FIG. 3 is a schematic view of an automated ticketing and boarding environment with an automated ticketing and boarding pass device operating in a check-in mode, according to one illustrated embodiment.

FIG. 3 shows the ATB device 30 operating in a check-in mode for printing a boarding pass, according to one illustrated embodiment.

The DCS 12 provides flight and/or passenger information 200 to the replacement ATB device 30 via the proprietary network 34, for example in response to a query by the ATB device 30. The flight and/or passenger information 200 may include formatted data 202 and an identifier 204 that identifies a media receptacle or a media type that will bear the information in the formatted data 202. As noted above, the formatted data 202 is typically formatted for being magnetically encoded in a magnetic stripe carried by the specific media. The airline host computing system 20 may provide airline-specific data 206 to the replacement ATB device 30 via the proprietary network 34. The ATB device 30 relies on PECTAB information or file 208 which may be stored in a memory (e.g., ROM 76, RAM 78) for interpreting the flight and/or passenger information 200 and/or airline specific data 206, particularly the formatted data 202.

Figure 4:
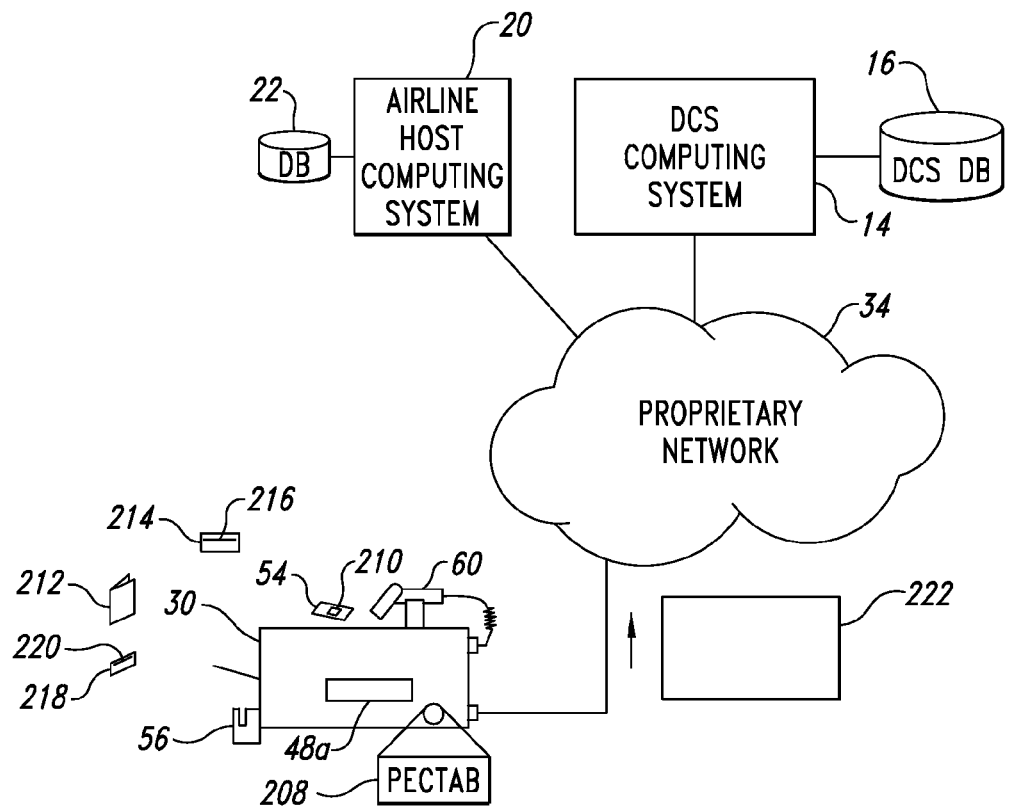
FIG. 4 is a schematic view of an automated ticketing and boarding environment with an automated ticketing and boarding pass device operating in a gate mode, according to another illustrated embodiment.

FIG. 4 shows the replacement ATB device 30 operating in a gate reader mode according to another illustrated embodiment.

The replacement ATB device 30 may optically read information from media, for example, boarding pass 54 which may carry an optically machine-readable symbol 210. The ATB device 30 may additionally, or alternatively, optically read information from media such as a passport 212 or other media. Alternatively, or additionally, the ATB device 30 may employ the magnetic stripe reader 56 to read information from magnetic stripe bearing media, for example, a conventional boarding pass 214 carrying magnetic stripe 216, or a plastic card 218 carrying magnetic stripe 220. The plastic card 218 may take any of a variety of forms, for example, a credit card, debit card, driver's license, or other financial or identification media. The information read 222 may be formatted using PECTAB 208 and transmitted to the DCS computing system 14 and/or airline specific host computing system 20.

Figure 5:
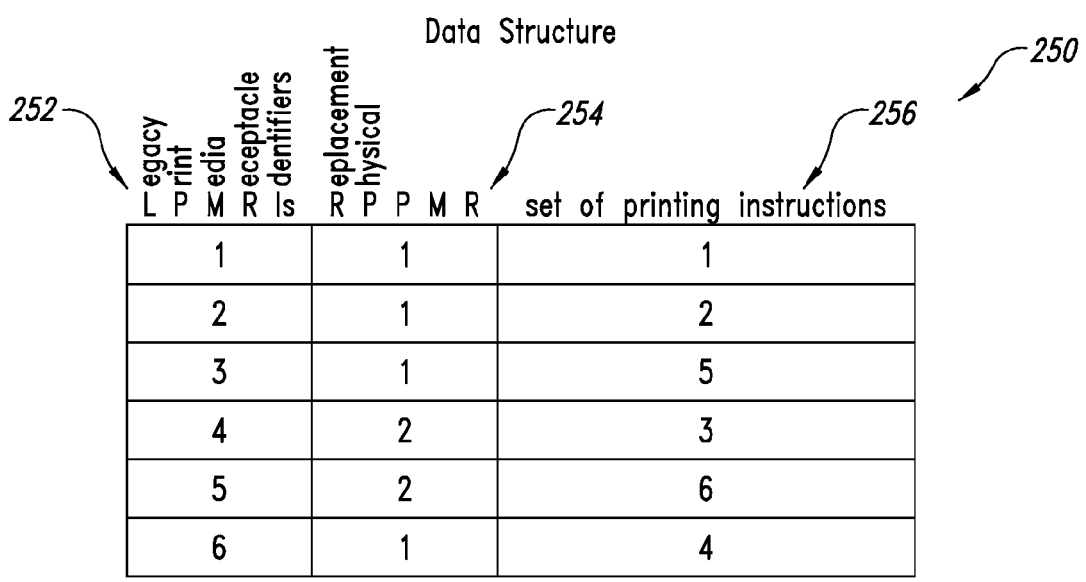
FIG. 5 is a schematic illustration of a data structure that may be stored in a computer- or processor-readable memory and which maps print media receptacles in a replacement automated ticketing and boarding device to print instructions and print media receptacles in a legacy printer, according to one illustrated embodiment.

FIG. 5 shows a data structure 250 which may be implemented in one or more memories (e.g., ROM 76, RAM 78) of the replacement or new ATB device 30, according to one illustrated embodiment.

The data structure 250 provides a mapping between the larger number of media receptacles 42 (FIG. 1) of the legacy boarding pass printer 28 and the smaller number of media receptacles 48a, 48b of the replacement ATB device 30. The data structure 250 further provides a mapping between the media receptacles 42 of the legacy boarding pass printer 28 and a set of printing instruction identifiers 256 which identify respective sets of printing instructions.

FIG. 6 shows a data structure 270 that maps the printing instruction identifiers 256 to additional print data 272 and/or additional formatting 274, according to one illustrated embodiment.

The additional print data 272 may provide data for printing text, indicia, background colors, watermarks, or other markings or indicia to mimic print media that would have been loaded or stored in the print media receptacles 42 of a legacy boarding pass printer 28. The additional formatting may include instructions for formatting to mimic formatting that would have appeared on print media loaded or stored in the print media receptacles 42 of the legacy boarding pass printer 28.

The data structures 250, 270 permit the replacement ATB device 30 to provide printed media that is identical to, or that closely resembles, the media that would have been provided by a legacy boarding pass printer, even though the ATB device 30 employs a fewer number of media receptacles 48 than the legacy boarding pass printer 28, and hence a fewer number of types of media.

Figure 7A:
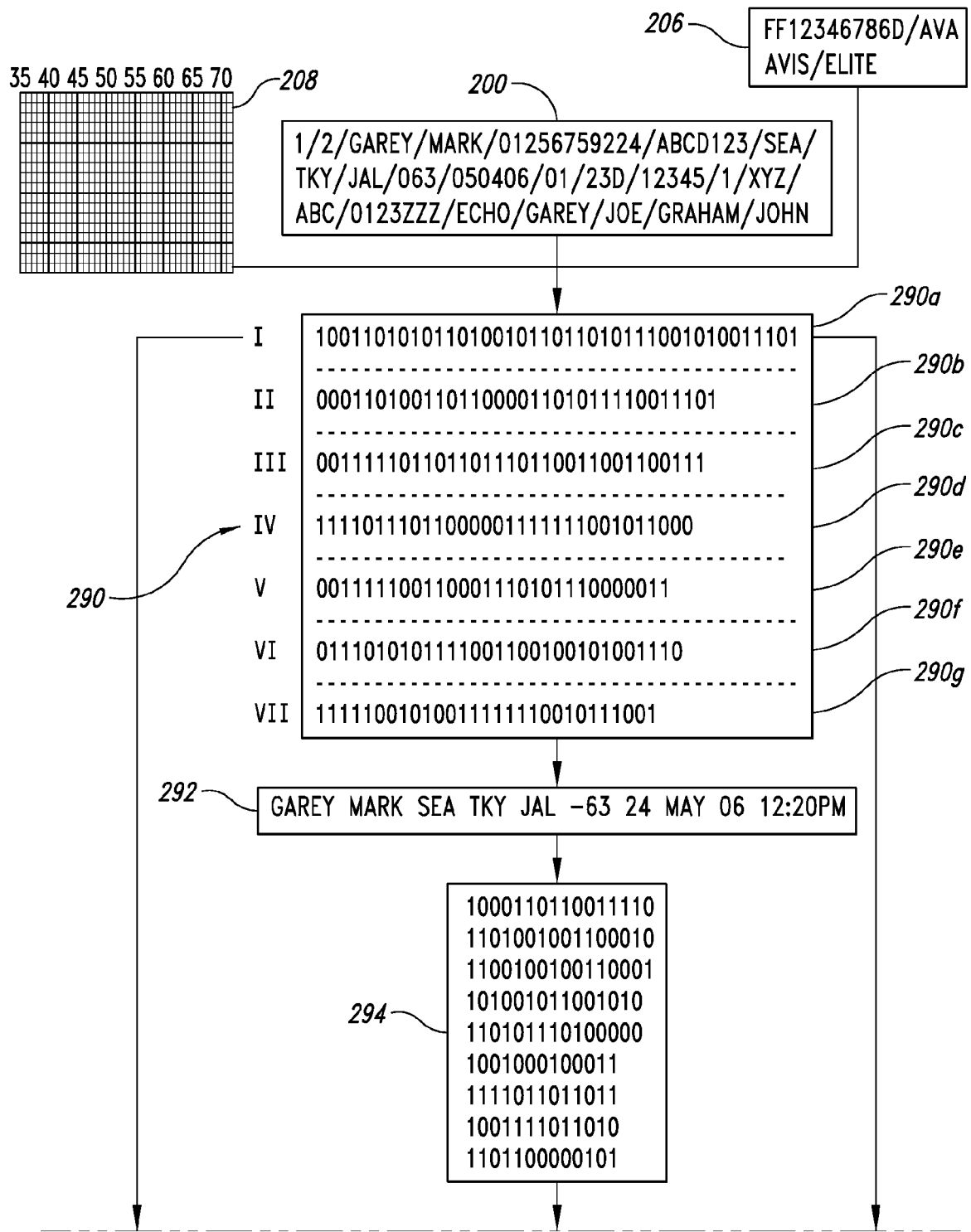
FIGS. 7A and 7B are a schematic diagram showing exemplary data flow, including flight and passenger data provided by a departure control system in a format intended for encoding in a magnetic stripe by a legacy boarding pass printer, and conversion thereof by the replacement automated ticketing and boarding pass device, and the resulting boarding pass, according to another illustrated embodiment.
Figure 7B:
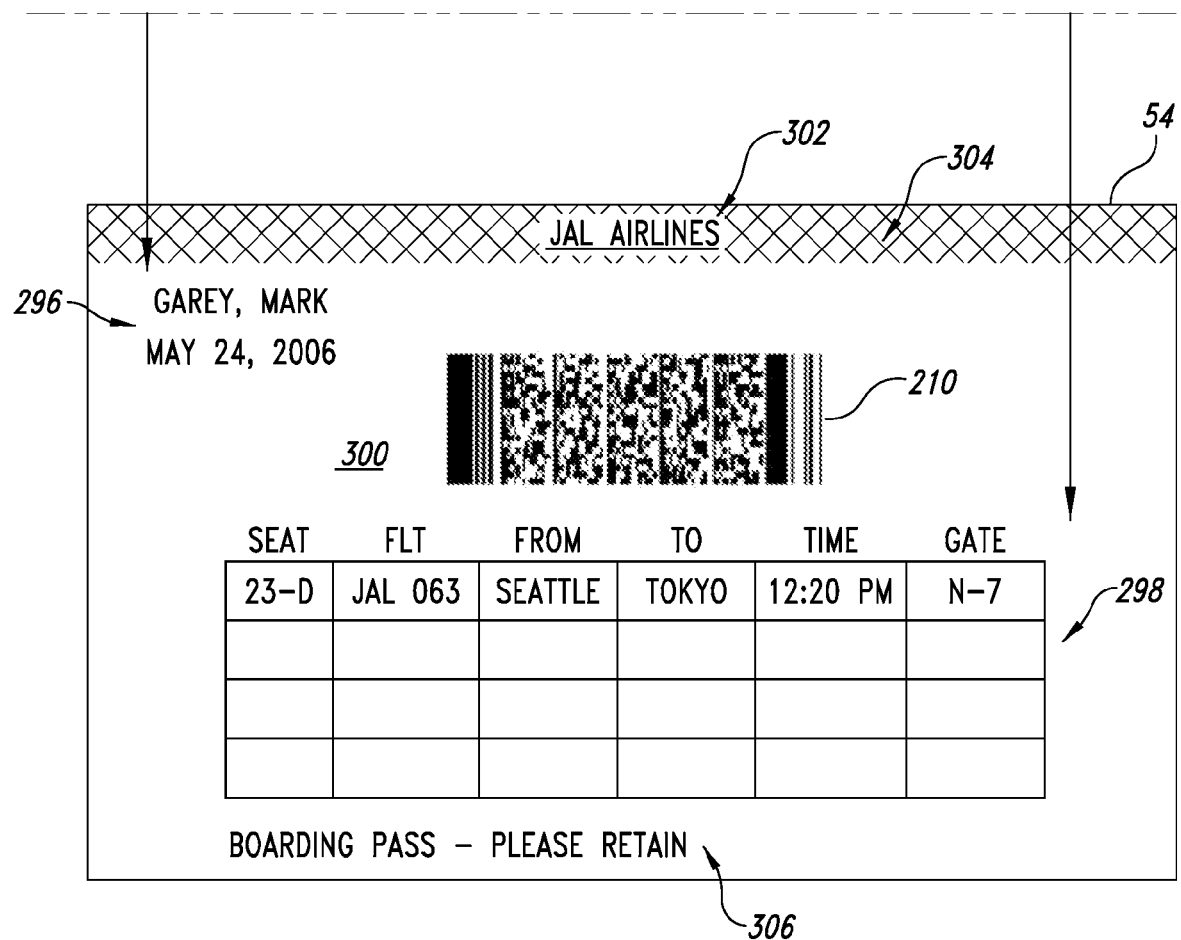

FIGS. 7A and 7B are a schematic diagram illustrating the process of data and information for producing a boarding pass 54, according to one illustrated embodiment.

Flight and/or passenger information 200 is received from the DCS computing system 14 (FIGS. 1, 3). Optionally, airline specific data 206 may be received from the airline host computing system 20 (FIGS. 1, 3). The replacement ATB device 30 stores or has access to a PECTAB 208 (FIG. 3). The ATB device 30 employs the PECTAB in creating a virtual magnetic stripe 290 in a memory (e.g., ROM 76, RAM 78) of the ATB device 30, form the received formatted data 202. The virtual magnetic stripe 290 may topographically resemble a physical magnetic stripe, for example, having four tracks (e.g., rows) 290a-290d of 72 characters (e.g., columns). In some embodiments, the virtual magnetic stripe 290 may include additional tracks, for example, three tracks 290e-290g.

The replacement ATB device 30 may extract a portion 292 of the information from the virtual magnetic stripe 290. The replacement ATB device 30 encodes the extracted portion 292 into print data 294 for printing an optically machine-readable symbol 210. The replacement ATB device 30 may also use portions of the virtual magnetic stripe 290 for printing human readable data 296, 298 on the boarding pass 54, based in part on the PECTAB 208 (FIG. 3).

The replacement ATB device 30 prints additional markings or indicia on the boarding pass 54, according to the print instructions 250, including the additional print data 272 and additional formatting 274 (FIG. 6). Thus, for example, the replacement ATB device 30 may print a background color 300 on all or a portion of a boarding pass 54. The replacement ATB device 30 may print a heading 302 in a separate color 304 on a portion of the ticket, for example, the top portion. The ATB device 30 may also print a message 306 on another portion of the boarding pass 54, for example, a footer along a bottom edge. Such additional print instructions and additional formatting allow the replacement ATB device 30 to mimic print media that would have been loaded or stored in one of the extra print media receptacles 42 of a legacy boarding pass printer 28.

Figure 8:
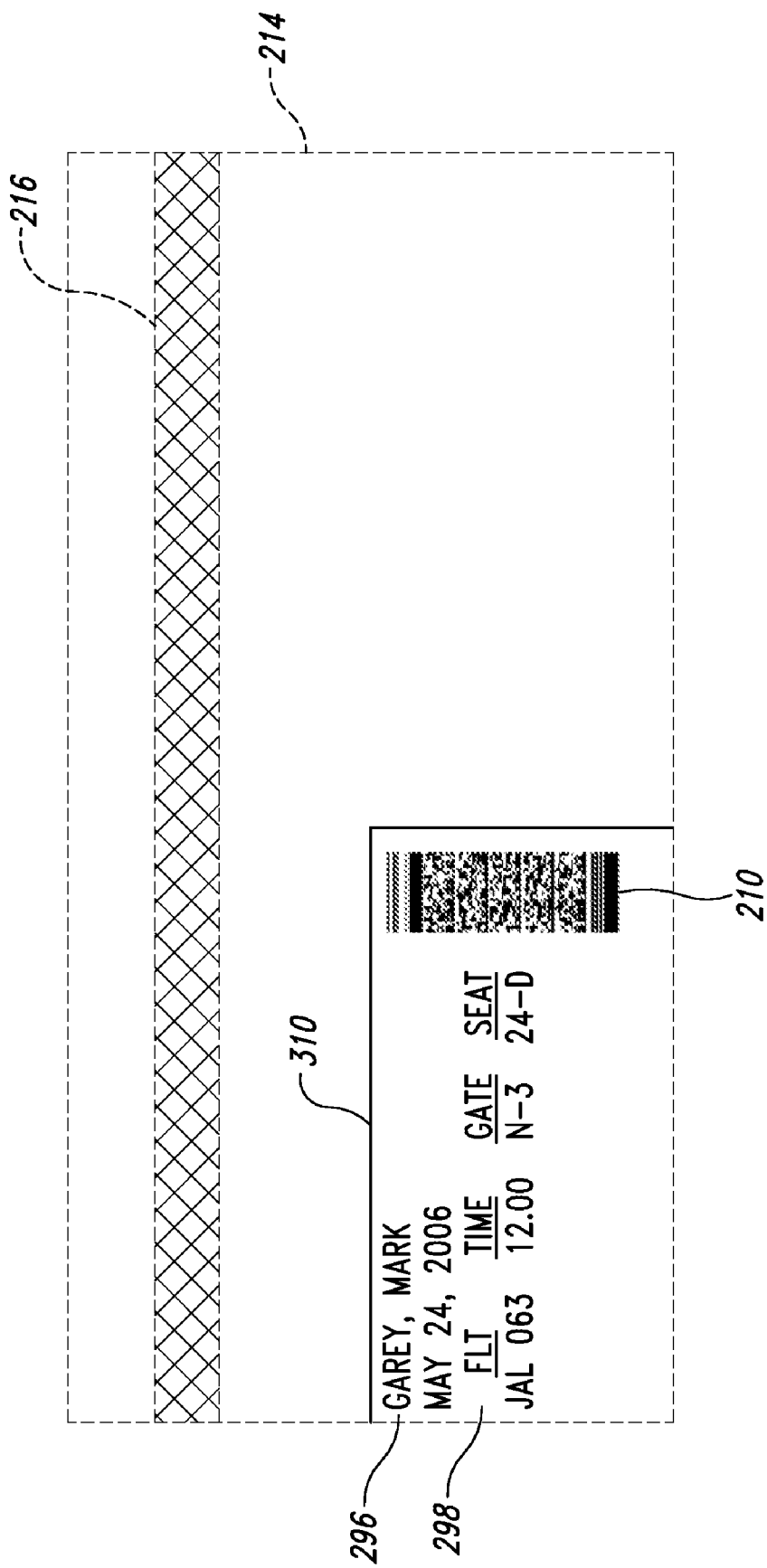
FIG. 8 is a schematic diagram showing a new boarding pass relative to a conventional boarding pass, according to one illustrated embodiment.

FIG. 8 shows a new boarding pass 310 carrying an optically machine-readable symbol 210, superimposed over a conventional boarding pass 214 that carries a magnetic stripe 216, according to one illustrated embodiment.

The new boarding pass 310 has significantly reduced dimensions with respect to conventional boarding passes 214, for example, dimensions that permit the boarding pass 310 to be stored a typical wallet or pocket. Thus, the boarding pass 310 may have length and width dimensions similar to that of a conventional credit card or driver's license. The boarding pass 310 includes an optically machine-readable symbol 210, passenger information 296, and flight information 298.

To print the new boarding pass 310, the replacement ATB device 30 relies on printing stored instructions 272 (FIG. 6), for example, the additional print data and formatting 272, 274, and thus must convert from the instructions received from the DCS computing system 14.

Figure 9A:
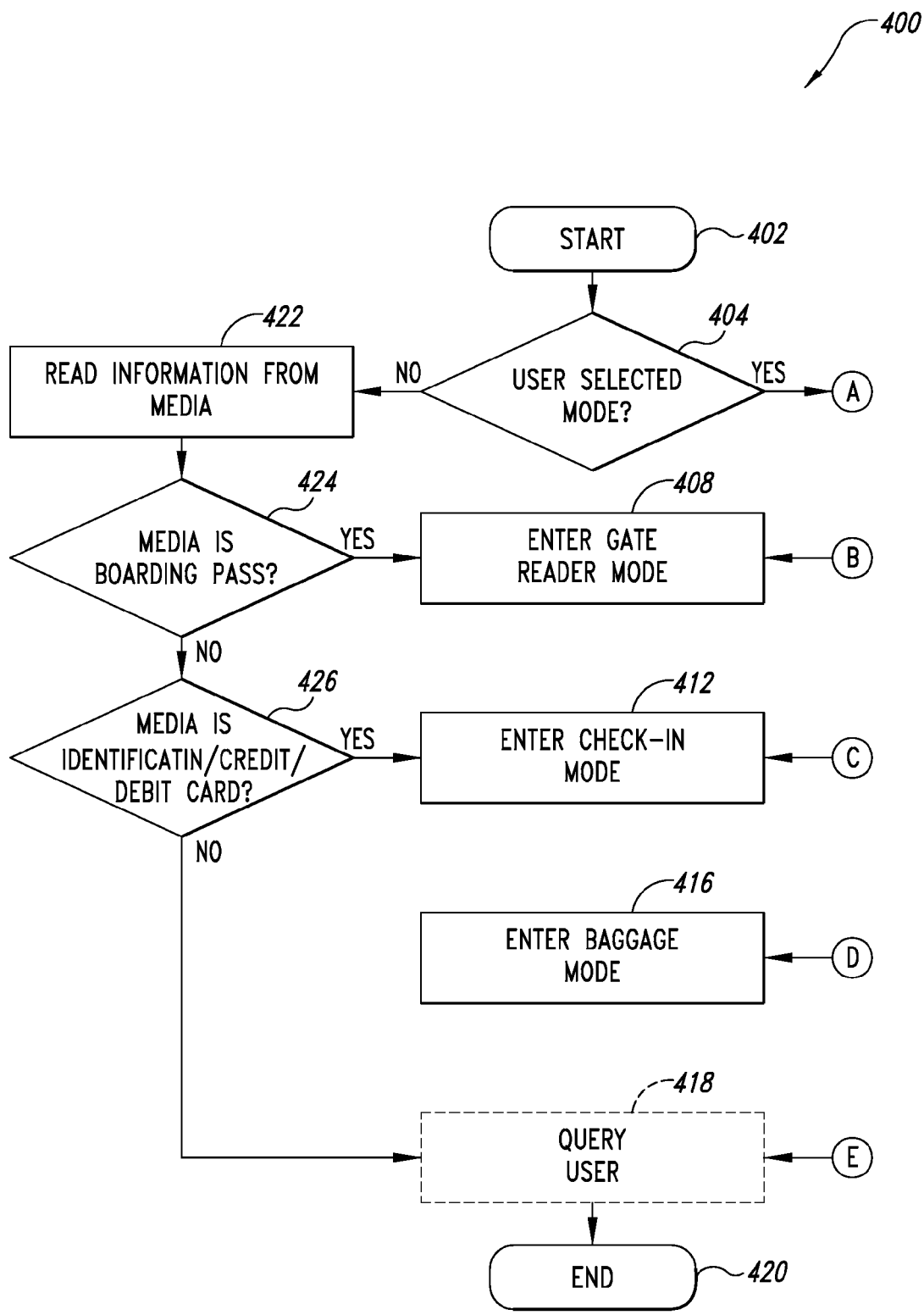
FIGS. 9A and 9B are a flowchart showing a method of operating the automated ticketing and boarding pass device to determine an operational mode, according to one illustrated embodiment.
Figure 9B:
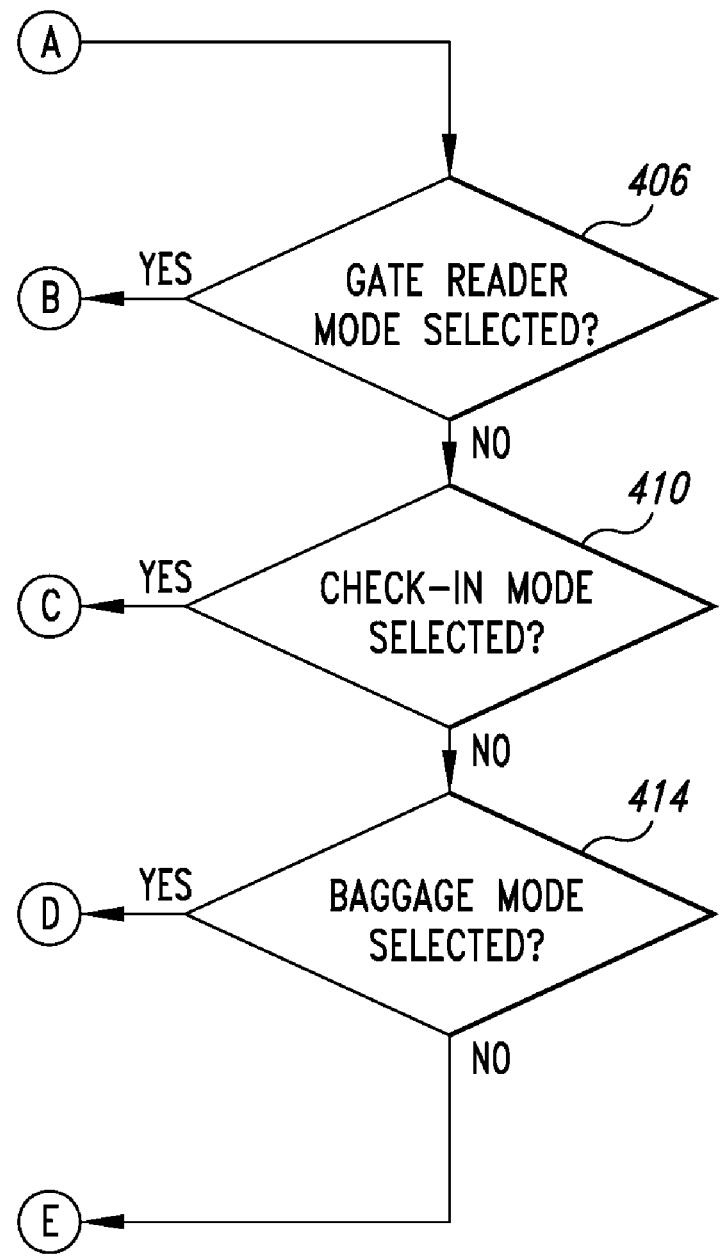

FIGS. 9A and 9B show a method 400 of operating the replacement ATB device 30 to set an operating mode to one of a gate reader mode, a check-in mode, and/or a baggage mode, according to one illustrated embodiment.

The method 400 starts at 402, for example, upon powering up of the ATB device 30, or in response to a selection via the keypad 86 of the user interface 82.

At 404, the processor 74 (FIG. 2) determines whether the user has selected an operating mode. If the user has selected an operating mode, at 406 the processor 74 determines whether the user has selected a gate reader mode. If the user has selected the gate reader mode, the microprocessor 74 enters a gate reader mode at 408. If the user has not selected the gate reader mode 406, then the microprocessor 74 determines whether the user has selected a check-in mode at 410. If the user has selected the check-in mode, the microprocessor 74 enters the check-in mode at 412. If the user has not selected a check-in mode, at 414 the microprocessor 74 determines whether the user has selected a baggage mode. If the user has selected the baggage mode at 414, the microprocessor 74 enters the baggage mode at 416. If not, at 418 the microprocessor 74 queries the user, for example, via the display 84. The query may be to select a mode. The method 400 then terminates at 420.

If the user has not selected a mode at 404, the ATB device 30 may read information from media at 422. At 424, the microprocessor 74 determines whether the media is a boarding pass. If the microprocessor 74 determines that the media is a boarding pass, the microprocessor 74 enters a gate reader mode at 408. If the microprocessor 74 determines that the media is not a boarding pass, then the microprocessor 74 determines whether the media is an identification or financial media at 426. If the microprocessor 74 determines that the media from which the information is read is identification and/or financial media, the microprocessor 74 enters a check-in mode at 412. Otherwise, the microprocessor 74 may optionally query the user at 418, and terminate the method 400 at 420. As noted above, identification or financial media may take the form of a passport, license, other identification card, credit card, debit card, or other similar media.

Figure 10A:
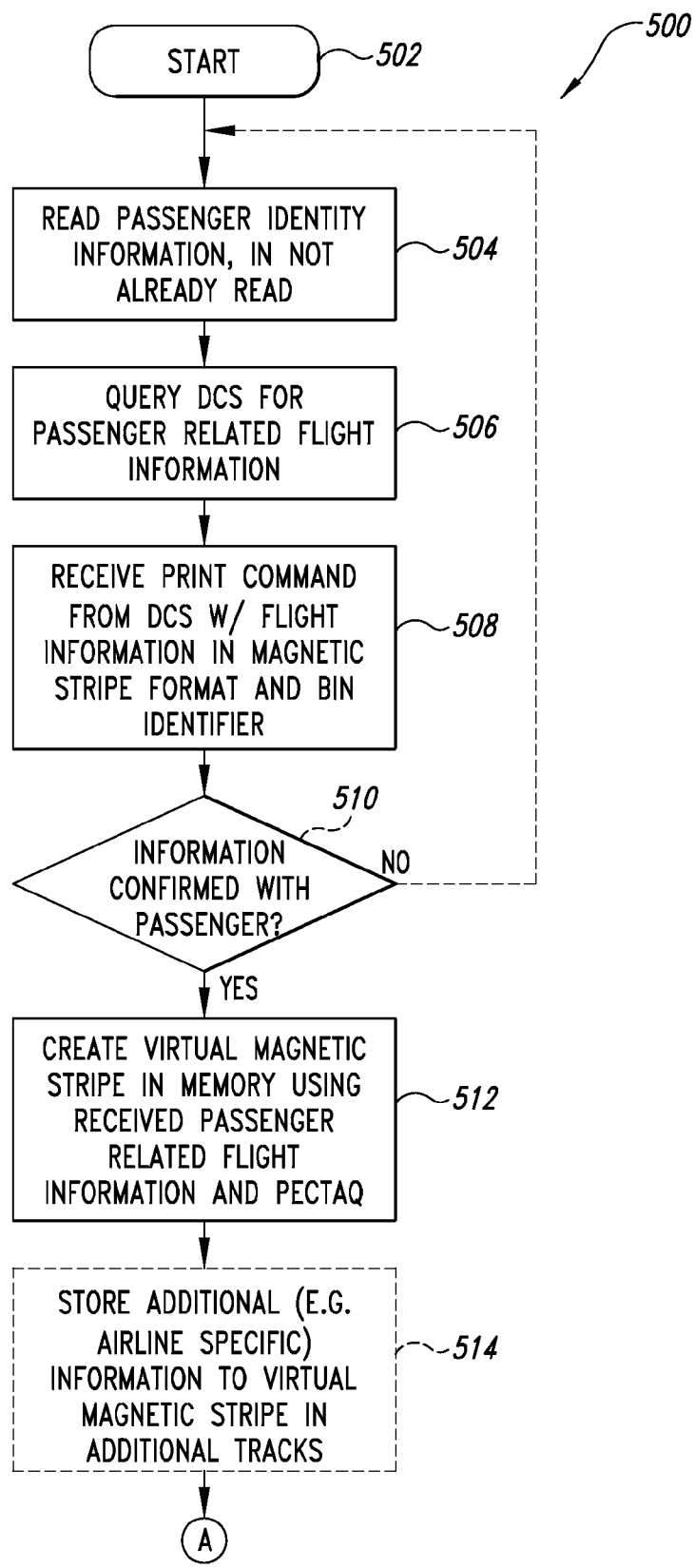
FIGS. 10A and 10B are a flow diagram showing a method of operating a replacement automated ticketing and boarding pass device in a check-in mode, according to one illustrated embodiment.
Figure 10B:
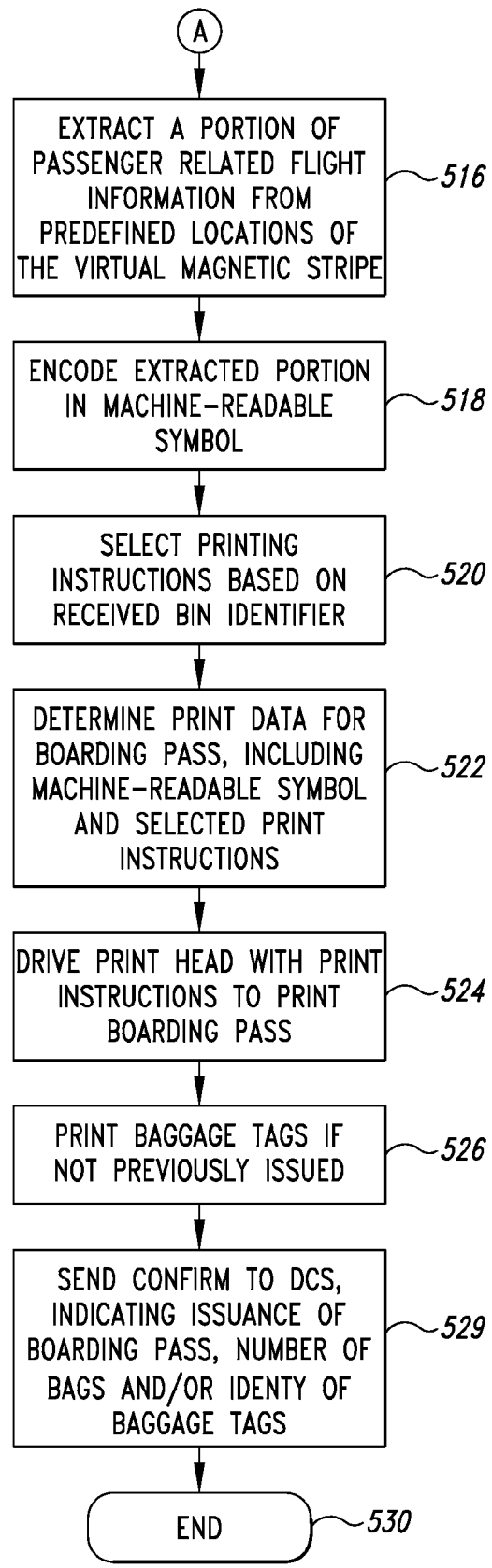

FIGS. 10A and 10B show a method 500 of operating the replacement ATB device 30 in a check-in mode, according to one illustrated embodiment.

The method 500 may start at 502, for example, in response to the microprocessor 74 entering the check-in mode at 412 of method 400 (FIGS. 9A, 9B).

At 504, the replacement ATB device 30 reads passenger identity information if not already read. At 506, the ATB device 30 queries the DCS 12 for passenger related flight information based on the identity information. At 508, the ATB device 30 receives flight and/or passenger information 200 (FIG. 3) from the DCS computing system 14 with a formatted data 202 formatted to be encoded in a magnetic stripe and an identifier 204 that identifies a media receptacle or media type. Optionally, at 510, a user of the ATB device 30 may confirm the received information with the passenger. For example, the user may confirm a destination with the passenger. If the information is not confirmed, control may return back to 504. If the information is confirmed, control may pass to 512.

At 512, the replacement ATB device 30 creates a virtual magnetic stripe 290 in a memory (e.g., RAM 78) using the received flight and passenger related information 200, using the PECTAB 208. Optionally at 514, the ATB device 30 stores additional (e.g., airline specific) information to the virtual magnetic stripe 290, for example in additional tracks 290e-290g.

At 516, the microprocessor 74 extracts a portion 292 (FIGS. 7A, 7B) of the flight and passenger related information from predefined locations of the virtual magnetic stripe 290. At 518, the microprocessor 74 encodes the extracted portion 292 into a machine-readable symbol data 294 (FIGS. 7A, 7B).

At 520, the microprocessor 74 selects a set of printing instructions 256 (FIG. 5) based on the received bin identifier. For example, the microprocessor 74 selects additional print data and/or additional formatting 272, 274 (FIG. 6). At 522, the microprocessor 74 determines print data for printing the boarding pass 54 (FIGS. 7A, 7B), including the optically machine-readable symbol 210 and selected print instructions. At 524, the microprocessor 74 drives the print head 104 (FIG. 2) with the print instructions to print the boarding pass 54. Optionally, at 526, the microprocessor 74 can cause the print head 104 (FIG. 2) print baggage tags if not previously issued.

At 528, the ATB device 30 sends confirmation to the DCS computing system 14, indicating issuance of the boarding pass 54 and optionally the number and/or identity of bags and/or baggage tags. The method 500 terminates at 530.

Figure 11A:
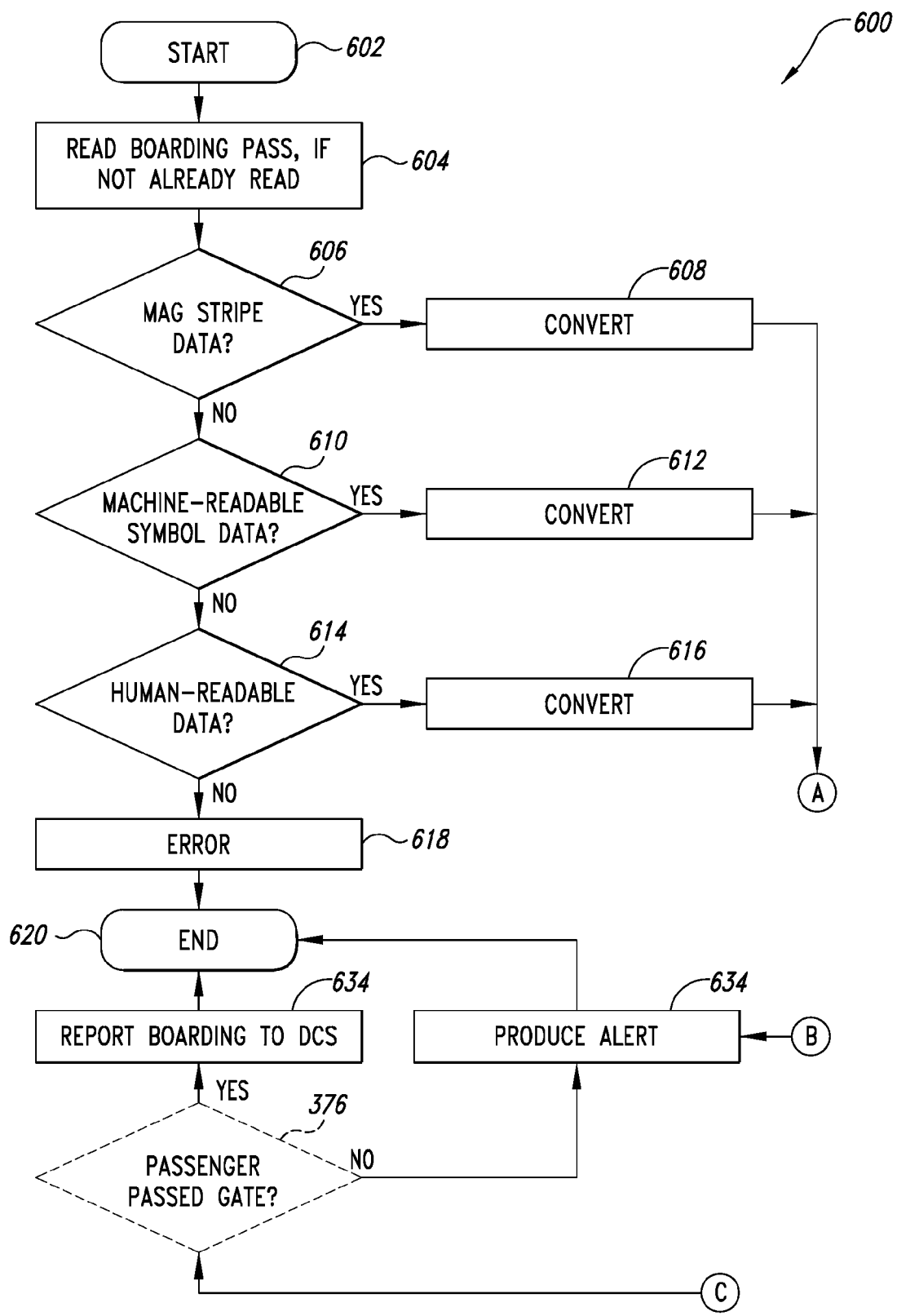
FIGS. 11A and 11B are a flow diagram showing a method of operating a replacement automated ticketing and boarding pass device in a gate mode, according to one illustrated embodiment.
Figure 11B:
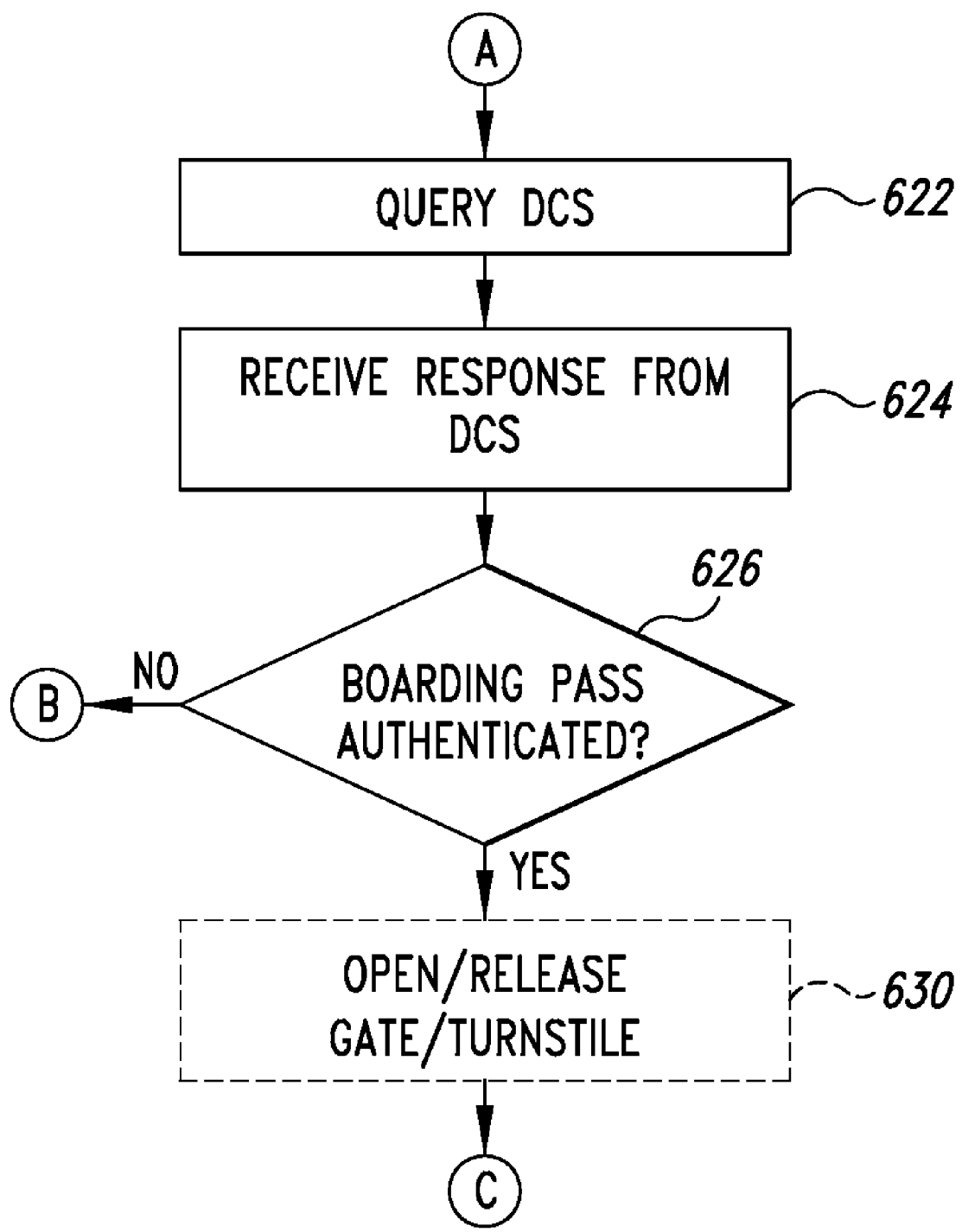

FIGS. 11A and 11B show a method 600 of operating an ATB device 30 in a gate reader mode, according to one illustrated embodiment.

The method starts at 602, for example, in response to entering the gate reader mode at 408 of method 400 (FIGS. 9A, 9B).

At 604, the ATB device 30 reads the boarding pass 54, if not already read. At 606, the microprocessor 74 determines whether the information was read from a magnetic stripe, and, if so, converts the data accordingly at 608. At 610, the microprocessor 74 determines whether the data was read from an optically machine-readable symbol, and, if so, converts the data accordingly at 612. Optionally, at 614, the microprocessor 74 determines whether the information is human readable information, and, if so, converts the data accordingly at 616, for example, using optical character recognition techniques. If the microprocessor 74 determines that the information is not from a magnetic stripe, optically readable machine-readable symbol, or human readable text, an error message is provided at 618 and the method 600 terminates at 620.

After converting the information at 608, 612, or 616, at 622 the microprocessor 74 queries the DCS host computing system 14. At 624, the replacement ATB device 30 receives a response from the DCS host computing system 14. At 626, the microprocessor 74 determines whether the boarding pass 54 has been authenticated. If the boarding pass has not been authenticated, the microprocessor 74 produces an appropriate alert at 628 and the method 600 terminates at 620.

If the boarding pass has been authenticated, the microprocessor 74 optionally provides a signal for opening or releasing a gate or turnstile at 630. Optionally, at 632, it is determined whether the passenger passed the gate or turnstile. If the passenger has not passed through the gate or turnstile, an appropriate alert is produced at 628, and the method terminates at 620.

If the boarding pass is authenticated at 626 or if the passenger has passed through the gate in optional act 632, the microprocessor 74 reports the boarding to the DCS host computing system 14 at 634. The method 600 then terminates at 620.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other automated tracking system, not necessarily the exemplary ATB system generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via ASICs. However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms of taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A printer, comprising:
   a first number of print media receptacles sized to hold print media;
   a print head operable to print on the print media; and
   a controller coupled to receive print commands comprising received print data and a legacy media identifier indicative of one of a second number of legacy print media receptacles of a legacy printer, a total number of legacy print media receptacles in the second number of legacy print media receptacles greater than a total number of print media receptacles in the first number of print media receptacles wherein the controller is configured to resolve at least two received print commands with respective legacy media identifiers that respectively identify at least two different ones of the legacy print media receptacles by causing the print head to print on the print media from a same one of the first number of print media receptacles.

2. The printer of claim 1 wherein the controller is further configured to determine whether there is additional print data based at least in part on the legacy media identifier in the received print command, and to cause the print head to print the additional print data, if any, on the print media.

3. The printer of claim 2, further comprising:
   at least one local processor-readable medium storing the additional print data.

4. The printer of claim 2 wherein the additional print data comprises a background color to be printed on at least a portion of the print media.

5. The printer of claim 1 wherein the controller is further configured to identify formatting based at least in part on the legacy media identifier, and to format the received print data based on the identified formatting before causing the print head to print on the print media.

6. The printer of claim 1, further comprising:
   a print media transport mechanism selectively operable to transport print media to the print head from the first number of print media receptacles.

7. The printer of claim 1 wherein the total number of print media receptacles in the first number of print media receptacles is one.

8. The printer of claim 7 wherein the legacy print media identifiers are each indicative of one of at least two legacy print media receptacles.

9. The printer of claim 1 wherein the print head is a thermal print head.

10. The printer of claim 1 wherein the print head is at least one of an inkjet print head or a laser print head.

11. A method of operating a replacement printer having a lesser number of print media receptacles than a number of print media receptacles of a legacy printer, the method of operating the replacement printer comprising:

receiving print commands at the replacement printer, the print commands including received print data and an identifier indicative of a selected one of the number of print media receptacles of the legacy printer;

based at least in part on the identifier indicative of the selected one of the number of print media receptacles of the legacy printer identified in the print commands received by the replacement printer, selecting between at least a first set of instructions for printing on print media from a first print media receptacle of the replacement printer and a second set of instructions for printing on print media from the first print media receptacle of the replacement printer, wherein the first set of instructions provide at least one of additional print data in addition to the received print data or additional formatting and wherein the second set of instructions is different from the first set of instructions; and printing on the print media from the first print media receptacle based on the selected one of the first and the second sets of instructions.

12. The method of claim 11 wherein receiving print commands at the replacement printer comprises receiving print commands from a legacy host system, wherein the legacy host system has not been reconfigured to operate with the replacement printer.

13. The method of claim 12 wherein the replacement printer sends a response to the legacy host system as if the legacy printer executed the print commands.

14. The method of claim 11, further comprising:
receiving a third set of instructions for printing on print media from the first print media receptacle of the replacement printer, wherein the third set of instructions is based at least in part on input received from a user interface of the replacement printer, wherein the selecting further comprises selecting the third set of instructions, if any, rather than the first or second sets of instructions, and wherein the printing further comprises printing on the print media from the first print media receptacle based on the selected one of the first, the second, and the third sets of instructions.

15. The method of claim 14, further comprising:
sending a notification message to the legacy host system in response to receiving the third set of instructions, wherein the notification message comprises information relating to the third set of instructions.

16. The method of claim 11 wherein the second set of instructions provide additional print data in addition to the received print data and different from the additional print data of the first set of instructions.

17. The method of claim 11 wherein the second set of instructions provide additional formatting, different from the additional formatting of the first set of instructions.

18. The method of claim 11 wherein the second set of instructions provide no additional print data and no additional formatting.

19. The method of claim 11, further comprising:
retrieving the additional print data from at least one processor-readable medium local to the replacement printer.

20. The method of claim 11 wherein printing on the print media comprises at least one of thermal printing, inkjet printing or laser printing.

* * * * *